United States Patent
Garg et al.

(10) Patent No.: US 11,336,457 B2
(45) Date of Patent: May 17, 2022

(54) METHOD AND SYSTEM FOR PRE-AUTHORIZATION OF ORPHANED BLOCKCHAIN TRANSACTIONS

(71) Applicant: MASTERCARD INTERNATIONAL INCORPORATED, Purchase, NY (US)

(72) Inventors: Chandan Garg, Haryana (IN); Puneet Keshtwal, Rajasthan (IN); Abhinav Thukral, Delhi (IN); Rahul Lamba, Uttar Pradesh (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 369 days.

(21) Appl. No.: 16/508,509

(22) Filed: Jul. 11, 2019

(65) Prior Publication Data

US 2021/0014069 A1    Jan. 14, 2021

(51) Int. Cl.
| | |
|---|---|
| *H04L 29/06* | (2006.01) |
| *H04L 9/32* | (2006.01) |
| *H04L 9/06* | (2006.01) |
| *H04L 9/30* | (2006.01) |

(52) U.S. Cl.
CPC .......... *H04L 9/3247* (2013.01); *H04L 9/0637* (2013.01); *H04L 9/0643* (2013.01); *H04L 9/30* (2013.01); *H04L 2209/38* (2013.01)

(58) Field of Classification Search
CPC ... H04L 9/3247; H04L 9/0637; H04L 9/0643; H04L 9/30; H04L 2209/38; H04L 9/0618; G06F 21/62; G06F 21/6209; G06F 21/6218; G06F 21/6227; G06F 16/1824; G06F 21/44; G06F 21/629; G06Q 20/06; G06Q 20/382; G06Q 20/401; G06Q 2220/00; G06Q 20/381; G06Q 40/04; G06Q 20/3825; G06Q 20/3827; G06K 9/00577; G06K 2009/00583
See application file for complete search history.

(56) References Cited

U.S. PATENT DOCUMENTS

| | | | |
|---|---|---|---|
| 2017/0364552 A1* | 12/2017 | Pattanaik | H04L 9/3297 |
| 2019/0034926 A1* | 1/2019 | Davis | H04L 9/3247 |
| 2019/0268138 A1* | 8/2019 | Mankovskii | G06F 21/64 |
| 2019/0311358 A1* | 10/2019 | Bhagavatha | G06Q 20/3827 |
| 2020/0162550 A1* | 5/2020 | Destefanis | H04L 9/0637 |
| 2020/0279284 A1* | 9/2020 | Garg | G06Q 20/02 |
| 2020/0396083 A1* | 12/2020 | Koduri | G06F 16/27 |

* cited by examiner

*Primary Examiner* — Malcolm Cribbs
(74) *Attorney, Agent, or Firm* — Buchanan Ingersoll & Rooney PC (57) ABSTRACT

A method for expedited confirmation and inclusion of orphaned transactions in a blockchain network includes: receiving new blockchain transactions, confirming each of the new blockchain transactions, receiving a new block accepted for the blockchain that includes only a subset of the confirmed blockchain transactions, generating a subsequent new block that includes at least the orphaned transactions that were not included in the received new block, and transmitting the subsequent new block to one or more other nodes in the blockchain network.

16 Claims, 5 Drawing Sheets

METHOD AND SYSTEM FOR PRE-AUTHORIZATION OF ORPHANED BLOCKCHAIN TRANSACTIONS

FIELD

The present disclosure relates to the pre-authorized of orphaned blockchain transactions, specifically the expedited inclusion of orphaned blockchain transactions in new blocks with expedited or bypassed confirmation in subsequent block generations.

BACKGROUND

In recent years, blockchains have seen increased usage throughout the world in a variety of different industries and contexts. Blockchains have been used to maintain cryptographic currencies, serve as storage and tracking for land ownership, assist in the casting and tracking of votes for public office, and data storage in industries where tracking and auditability are sought. A new entry that is to be made into a blockchain, generally called a blockchain "transaction," must first be confirmed by a node in the blockchain network that maintains the blockchains, included in a new block that is generated by the node, and that block confirmed and accepted by other nodes in the blockchain network.

In standard blockchains, nodes compete to have the block they generate and propose to the other nodes be accepted as the next block that gets added to the chain. As a result, a node may confirm transactions that are included in a new block they generate and propose to the other nodes, only to find out that another block has been accepted instead of theirs (e.g., due to speed, size of the block, or a variety of other factors), resulting in a wasted effort and requiring them having to start on a new block. Each block thereby becomes a competition between nodes to have their block be the next one that is accepted, where many blockchains provide a fee to the node that proposes the accepted block.

As mentioned above, each new block includes new transactions that are being added to the blockchain. However, as each node generates their own block for proposing to the blockchain, each node can include whatever transactions they see fit. In standard blockchains, each transaction is accompanied by a fee gained by the node that includes that transaction in an accepted block, often referred to as a "mining fee," where greater fees paid by an involved party often result in faster inclusion of that transaction. Thus, each node may have different methodology for including new transactions in a block. However, this results in cases where a transaction may be submitted and confirmed by a node that includes it in its newly generated block, but where a different block from a different node may be accepted instead that does not include this new transaction. As a result, this new transaction becomes an "orphaned" transaction, which has been confirmed but not included in a new block.

Traditionally, orphaned transactions sit in a pool of available transactions that nodes are free to include in new blocks. However, in traditional systems, these orphaned transactions are treated the same as newly submitted transactions, where a node confirms each transaction it decides to include in its next block. Unfortunately, this means that in cases where an orphaned transaction is orphaned more than once, nodes expend computing time and resources to confirm the transaction over and over again. As the frequency of transactions in a blockchain increases, the number of orphaned transactions increases, and thereby the wasted computing time and resources is compounded, where each wasted bit of time and energy could have been used to confirm and include more transactions and thus improve the overall efficiency of the blockchain.

Thus, there is a need for a technical solution whereby the speed of confirming and including orphaned transactions in a blockchain can be increased, saving on computing time and resources for blockchain nodes and thus increasing the speed and efficiency of a blockchain.

SUMMARY

The present disclosure provides a description of systems and methods for expedited confirmation and inclusion of orphaned transactions in a blockchain network. A node in a blockchain network confirms a group of new transactions and attempts to include these transactions in a new block it generates. In cases where a different block is added to the blockchain first that does not include all of the group of new transactions, the remaining transactions are considered orphaned transactions. Rather than treat these orphaned transactions as standard transactions, the node may then include these orphaned transactions in its next group of new transactions, but may forego confirmation of the orphaned transactions, instead relying on the fact that they were previously confirmed to ensure that they are accurate. The result is that the new block can be generated and confirmed faster, increasing the efficiency of the blockchain. In some cases, a blockchain node may continue to pool together orphaned transactions until they reach a predetermined number, and then create a block full of only orphaned transactions where none of the transactions have to be confirmed, resulting in significantly faster generation and confirmation of the block.

A method for expedited confirmation and inclusion of orphaned transactions in a blockchain network includes: receiving, by a receiver of a node in a blockchain network, a plurality of blockchain data values, where each blockchain data value is related to a blockchain transaction including at least a digital signature and a public key; confirming, by a processing device of the node, each of the plurality of blockchain data values, where confirming a blockchain data value includes at least validating the included digital signature using the included public key; receiving, by the receiver of the node, a new confirmed block, where the new confirmed block includes at least a confirmed header and a set of data values, the set of data values including a subset of the plurality of blockchain data values; generating, by the processing device of the node, a new block header, where the new block header includes at least a timestamp, a header reference value generated by hashing, by the processing device of the node, the confirmed header, and a transaction reference value generated by hashing, by the processing device of the node, at least a group of blockchain data values including each blockchain data value in the plurality of blockchain data values not included in the subset of the plurality of blockchain data values; generating, by the processing device of the node, a new block, where the new block includes at least the new block header and the group of blockchain data values; and transmitting, by a transmitter of the node, the generated new block to one or more other nodes in the blockchain network.

A system for expedited confirmation and inclusion of orphaned transactions in a blockchain network includes: a transmitter of a node in a blockchain network; a receiver of the configured to receive a plurality of blockchain data values, where each blockchain data value is related to a blockchain transaction including at least a digital signature and a public key; and a processing device of the node configured to confirm each of the plurality of blockchain data values, where confirming a blockchain data value includes at least validating the included digital signature using the included public key, wherein the receiver of the node is further configured to receive a new confirmed block, where the new confirmed block includes at least a confirmed header and a set of data values, the set of data values including a subset of the plurality of blockchain data values, the processing device of the node is further configured to generate a new block header, where the new block header includes at least a timestamp, a header reference value generated by hashing, by the processing device of the node, the confirmed header, and a transaction reference value generated by hashing, by the processing device of the node, at least a group of blockchain data values including each blockchain data value in the plurality of blockchain data values not included in the subset of the plurality of blockchain data values, and generate a new block, where the new block includes at least the new block header and the group of blockchain data values, and the transmitter of the node is configured to transmit the generated new block to one or more other nodes in the blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Expedited Confirmation and Inclusion of Orphaned Transactions

Figure 1:
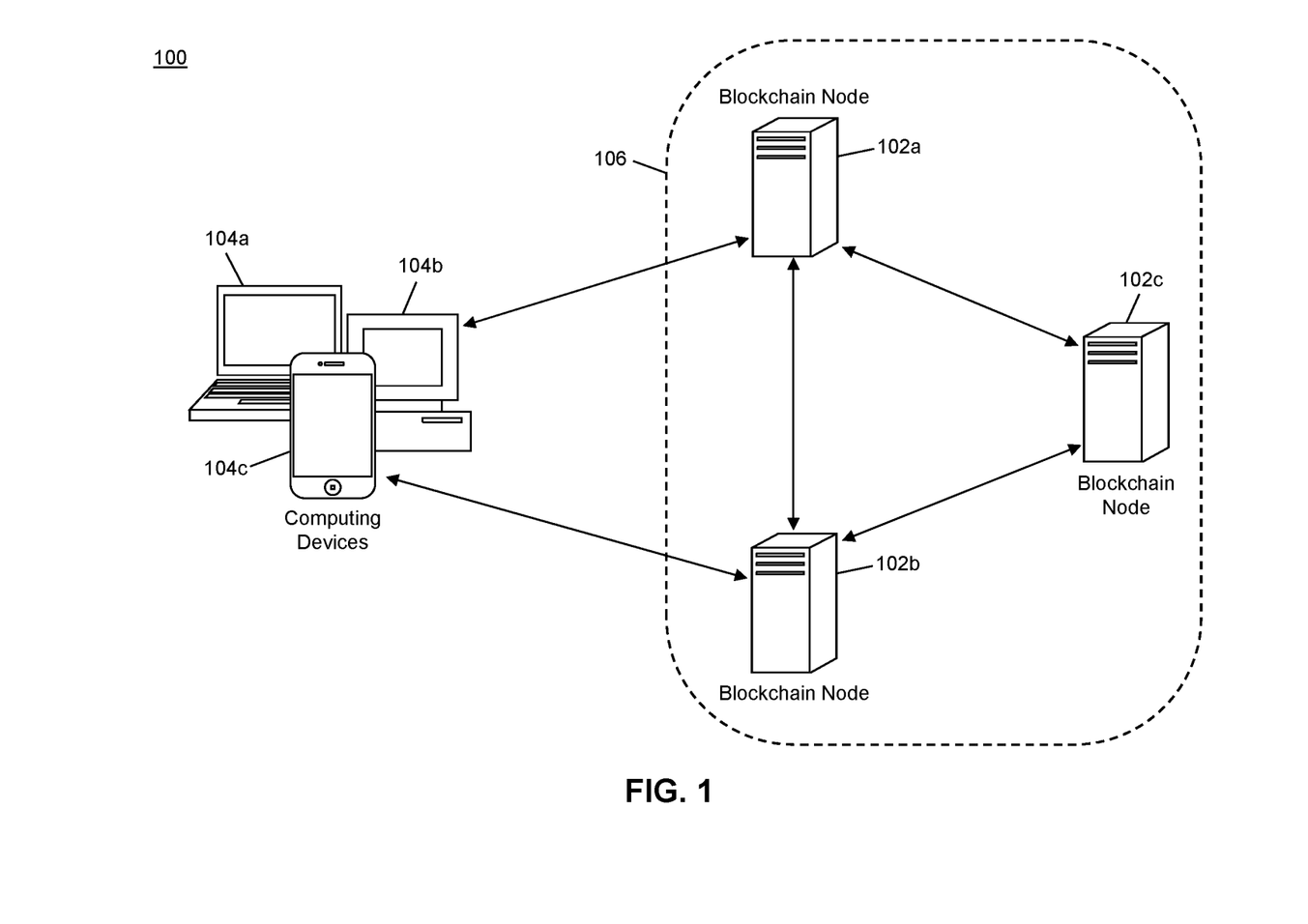
FIG. 1 is a block diagram illustrating a high level system architecture for expedited confirmation and inclusion of orphaned transactions in accordance with exemplary embodiments.

FIG. 1 illustrates a system 100 for the expedited confirmation and inclusion of orphaned transactions in a new block of a blockchain due to prior confirmation thereof in a blockchain network.

The system 100 may include a blockchain network 106. The blockchain network 106 may be comprised of a plurality of blockchain nodes 102. Each blockchain node 102, discussed in more detail below, may be a specially configured computing system that is configured to perform functions related to the processing and management of the blockchain, including the generation of blockchain data values, confirmation of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 102 in the blockchain network 106 prior to the generation and addition of a new block to the blockchain in order for the change to be made permanent. Computational and communication limitations may make such a modification exceedingly difficult, if not impossible, thus rendering the blockchain immutable.

Each blockchain data value stored in the blockchain may correspond to a blockchain transaction. The contents of a blockchain transaction may vary depending on the context of the blockchain and its usage. For instance, in blockchains used to track land ownership, a blockchain transaction may include information regarding a prior owner, transfer of the related land to a new owner, the new owner, and the land that the transfer is related to. In blockchains used for cryptographic currency, a blockchain transaction may include an input transaction, an output address, and a transaction amount. Regardless of the content of a blockchain transaction, a blockchain node 102 may be required to confirm a blockchain transaction prior to its inclusion in a new block that is generated for addition to the blockchain. Actions required for confirmation of a blockchain transaction may vary depending on the content and use of the blockchain transaction itself.

For example, in blockchains related to the use of cryptographic currency, confirmation of a blockchain transaction may include verification of a digital signature provided by the sender of currency using a public key of a cryptographic key pair associated therewith, confirming that the sender has access to the provided input transaction(s) (e.g., by verifying the digital signature using a public key included in each input transaction), and confirming that the input transactions give the sender access to a suitable amount of currency to cover the newly proposed blockchain transaction. In blockchains related to the casting of votes for public office, confirmation of a blockchain transaction may include verification of the identity of the submitter (e.g., such as verifying a digital signature included in the transaction using a public key associated with a registered voter) and confirming that the voter has not already cast a vote for the election.

In the system 100, a blockchain node 102 may receive a plurality of blockchain data values related to blockchain transactions from any number of computing devices 104. Computing devices 104, illustrated in FIG. 1 as the computing devices 104a, 104b, and 104c, may be any type of device suitable for performing the functions discussed herein, such as a desktop computer, laptop computer, notebook computer, tablet computer, cellular phone, smart phone, smart watch, smart television, wearable computing device, implantable computing device, etc. The computing devices 104 may submit new blockchain data values to the blockchain node 102 using any suitable communication network and method.

The blockchain node 102 may receive the new blockchain data values and may confirm each blockchain data value. As discussed above, confirmation of each blockchain data value may include at least verifying a digital signature included therein using a public key, and may also include other confirmations depending on the context and use of the blockchain data values and the associated blockchain itself. Once all blockchain data values have been confirmed, the blockchain node 102 may include each of these blockchain data values in a new block that is generated by the blockchain node 102. Generation of the new block may include hashing the group of blockchain data values to generate a transaction reference value, generating a block reference value using the block header of the most recently added block to the chain, generating a new block header that includes the transaction and block reference values, and generating a new block that includes the new block header and the group of blockchain data values.

The blockchain node 102 may then transmit the newly generated block to other blockchain nodes 102 in the blockchain network 106. For instance, the blockchain node 102a may receive the group of blockchain data values from the computing devices 104 and may transmit its newly generated block to blockchain nodes 102b and 102c. The blockchain nodes 102b and 102c may then attempt to confirm the new block (e.g., verifying its block reference value, transaction reference value, etc.) and the blockchain nodes 102 may attempt to reach consensus. Consensus may be reached when a predetermined number (e.g., a majority, supermajority, etc.) of the blockchain nodes 102 in the blockchain network 106 have confirmed and accepted a new block. Methods for consensus of new blocks may vary depending on the blockchain network 106 and implementation as may be apparent to persons having skill in the relevant art.

In some cases, the new block submitted by the blockchain node 102a may not be accepted as the new block, with the blockchain nodes 102 reaching a consensus to accept a block proposed by a different blockchain node 102, such as by blockchain node 102c. In such cases, the new block generated by the blockchain node 102a may include several blockchain data values that are not found in the accepted block. In these cases, the several blockchain data values not found in the accepted block are considered to be "orphaned" transactions. The blockchain node 102a may store data internally that indicate each of these transactions to be an orphaned transaction, which may be distinct from any new blockchain data values received from the computing devices 104.

Once the new block has been accepted and distributed to all of the blockchain nodes 102, each of the blockchain nodes 102 may receive new blockchain data values from computing devices 104 and proceed with generating and proposing a new block for the new blockchain data values. In some instances, each blockchain node 102 may be free to include or exclude any orphaned transaction in the group of blockchain data values being used in the new block being generated by the blockchain node 102. In traditional systems, a blockchain node 102 must confirm every blockchain data value being included in the new block, including all orphaned transactions. However, in the system 100, a blockchain node 102 may forego confirmation of each orphaned transaction.

For example, the blockchain node 102a may receive 25 blockchain data values from the computing devices 104, where 10 of the blockchain data values may get orphaned. The blockchain node 102 may then receive 15 new blockchain data values and may generate a new block, only having to confirm the 15 new blockchain data values and being able to skip confirmation on the 10 orphaned blockchain data values since they were previously confirmed. The blockchain node 102 can then have 25 blockchain data values in its new block that were confirmed in only 60% of the time, providing for a 40% increase in speed and thus a decrease in computing resources and energy expended. Thus, the methods and systems discussed herein provide for increased efficiency in the operation of a blockchain.

In some embodiments, the blockchain node 102 may pool orphaned transactions together until there is a predetermined number of orphaned transactions awaiting inclusion in a new block. In some cases, a blockchain node 102 may be required to review subsequent new blocks that are added to the blockchain, which may include previously orphaned transactions (e.g., 10 blockchain data values may be orphaned in a first block, but where 5 of those are added back into the next block that is accepted by the blockchain nodes 102). In some instances, when the orphaned transactions reaches the predetermined number, the blockchain node 102 may generate a new block that includes only orphaned blockchain data values, where the block may be generated without any confirmation step being performed due to all of the orphaned blockchain data values being pre-authorized due to the earlier confirmation of each.

In some embodiments, a block header for a new block may include a flag that indicates if one or more blockchain data values included therein are orphaned. In some instances, the flag may indicate which blockchain data values are orphaned. In other instances, the flag may be used in cases where a block is comprised completely of orphaned blockchain data values, such as in instances where orphaned blockchain data values are pooled until a predetermined number is reached, and where orphaned blockchain data values may not be included in any new block until a block is created the is comprised solely of orphaned blockchain data values.

Blockchain Node

Figure 2:
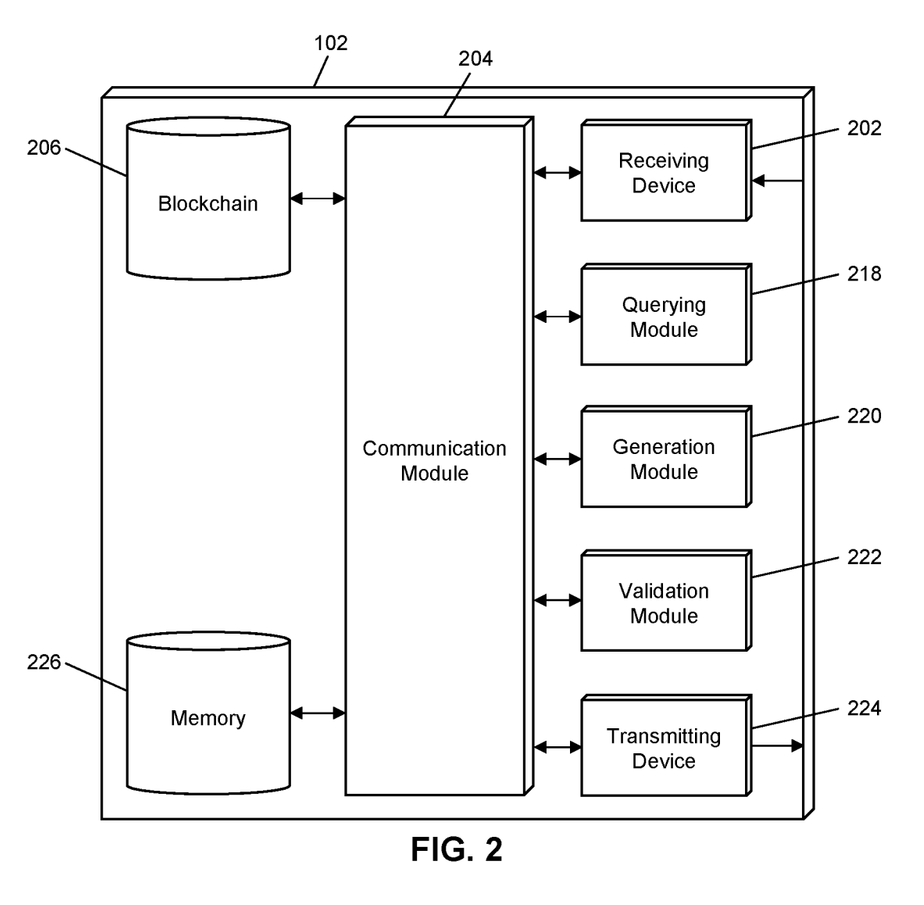
FIG. 2 is a block diagram illustrating the blockchain node of the system of FIG. 1 for expedited confirmation and inclusion of orphaned transactions in accordance with exemplary embodiments.

FIG. 2 illustrates an embodiment of a blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 500 illustrated in FIG. 5 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102, computing devices 104, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 104 that are superimposed or otherwise encoded with new blockchain data values for confirmation and inclusion in new blocks generated for the blockchain. The receiving device 202 may also be configured to receive data signals electronically transmitted by other blockchain nodes 102 in the blockchain network 106, which may be superimposed or otherwise encoded with new blocks for confirmation, acceptance messages, and other data used in the operation and maintenance of the blockchain.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 102 may include a blockchain 206. As discussed above, the blockchain 206 may be comprised of a plurality of blocks, where each block includes a block header and one or more blockchain data values. The blockchain 206 as stored in the blockchain node 102 may be the same as the blockchain 206 stored in every other blockchain node 102 in the blockchain network 106. In some cases, the blockchain 206 stored in the blockchain node 102 as referred to herein may also refer to the storage of other data associated with operation and maintenance of the blockchain associated with the blockchain network 106, such as orphaned blockchain data values, the predetermined number for pooled orphaned blockchain transactions, public keys, hashing algorithms, etc.

The blockchain node 102 may include a querying module 218. The querying module 218 may be configured to execute queries on databases to identify information. The querying module 218 may receive one or more data values or query strings, and may execute a query string based thereon on an indicated database, such as the blockchain 206 of the blockchain node 102 to identify information stored therein. The querying module 218 may then output the identified information to an appropriate engine or module of the blockchain node 102 as necessary. The querying module 218 may, for example, execute a query on the blockchain 206 to identify blockchain data values added to a newly accepted block to determine if any confirmed blockchain data values have been orphaned.

The blockchain node 102 may also include a generation module 220. The generation module 220 may be configured to generate data for use by the blockchain node 102 in performing the functions discussed herein. The generation module 220 may receive instructions as input, may generate data based on the instructions, and may output the generated data to one or more modules of the blockchain node 102. For example, the generation module 220 may be configured to generate block reference values and transaction reference values using hashing algorithms, generate new block headers, and generate new blocks for the blockchain.

The blockchain node 102 may also include a validation module 222. The validation module 222 may be configured to perform validations and verifications for the blockchain node 102 as part of the functions discussed herein. The validation module 222 may receive instructions as input, which may include data to be validated and/or data to be used in the validation. The validation module 222 may perform a validation or verification as requested, and may output a result of the validation to another module or engine of the blockchain node 102. The validation module 222 may, for example, be configured to confirm blockchain data values via validating a digital signature using a public key and any other confirmations necessary for a blockchain data value depending on the data included therein. The validation module 222 may also be configured to validate and confirm new blocks proposed by other blockchain nodes 102 in the blockchain network 106 using traditional methods.

The blockchain node 102 may also include a transmitting device 224. The transmitting device 224 may be configured to transmit data over one or more networks via one or more network protocols. In some instances, the transmitting device 224 may be configured to transmit data to other blockchain nodes 102, computing devices 104, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to other blockchain nodes 102 in the blockchain network 106 that are superimposed or otherwise encoded with new blocks, block acceptance messages, and other data for use in the operation and maintenance of the blockchain. The transmitting device 224 may also be configured to electronically transmit data signals to computing devices 104 that are superimposed or otherwise encoded with notification messages, such as notification regarding when a submitted blockchain data value is included in a new block that is accepted for the blockchain, reference identifiers, etc.

The blockchain node 102 may also include a memory 226. The memory 226 may be configured to store data for use by the blockchain node 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, hashing algorithms for generating blocks, credentials for validation, usage rule templates, communication data for blockchain nodes 102, communication data for computing devices 104, signature generation and verification algorithms, predetermined numbers, orphaned blockchain data values, etc.

Process for Expedited Confirmation of Orphaned Transactions

Figure 3:
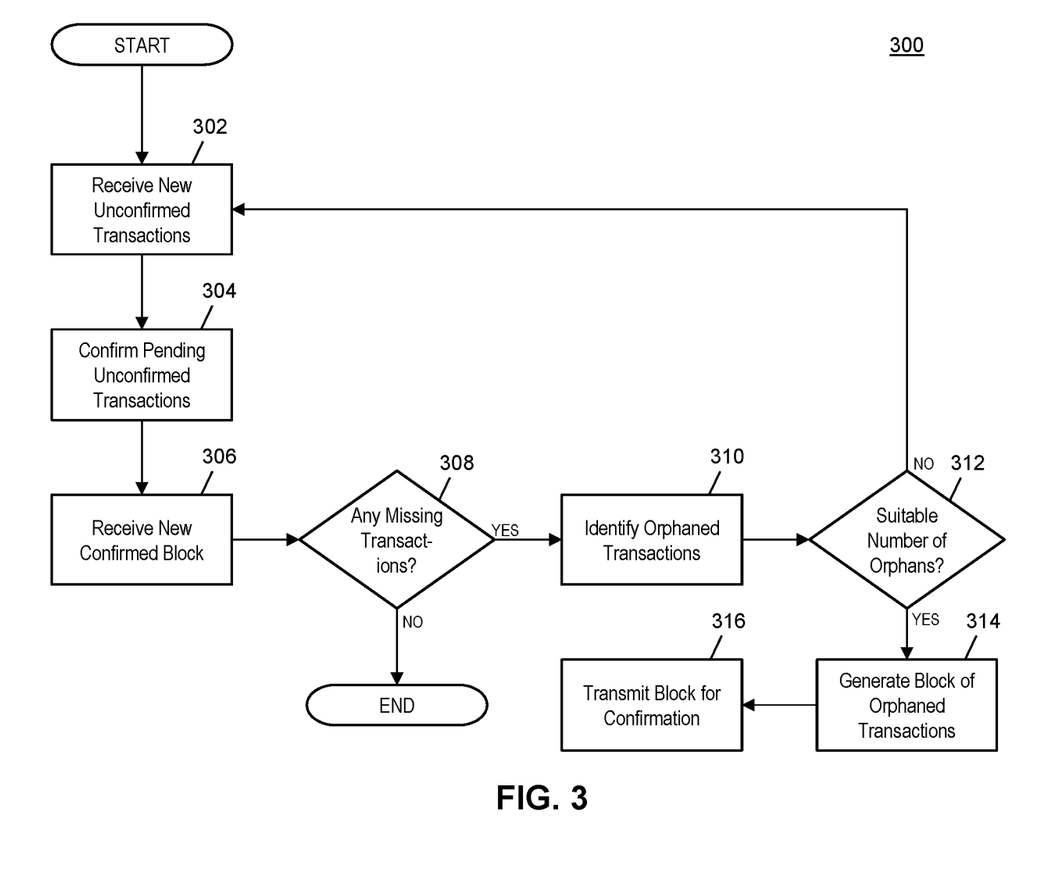
FIG. 3 is a flow diagram illustrating a process for expedited confirmation and inclusion of orphaned transactions performed by the blockchain node of FIG. 2 in accordance with exemplary embodiments.

FIG. 3 illustrates an example process 300 executed by the blockchain node 102 in the system 100 of FIG. 1 for the expedited confirmation and inclusion of orphaned blockchain data values in a new block for inclusion in a blockchain associated with the blockchain network 106.

In step 302, the receiving device 202 of the blockchain node 102 may receive a plurality of new, unconfirmed blockchain data values for blockchain transactions from computing devices 104, submitted to the blockchain node 102 using suitable communication networks and methods. In step 304, the validation module 222 of the blockchain node 102 may confirm each of the new, unconfirmed blockchain data values by at least validating a digital signature included in each unconfirmed blockchain data value using a public key, and performing any other confirmations as necessary. In step 306, the receiving device 202 of the blockchain node 102 may receive a new block from another blockchain node 102 in the blockchain network 106 that has been confirmed and accepted by a majority (e.g., or other amount, as applicable) of the other blockchain nodes 102 in the blockchain network 106.

In step 308, the blockchain node 102 may determine if any of the received new, now-confirmed blockchain data values are missing from the new block. The determination may be based on, for instance, the execution of a query by the querying module 218 of the blockchain node on the new block in the blockchain 206 to identify each new, now-confirmed blockchain data value therein, where any failed identification indicates that the corresponding blockchain data value is missing. If no blockchain data values are missing, such that all of the new, now-confirmed blockchain data values are now in the blockchain 206, than the process 300 may be completed.

If, in step 308, one or more blockchain data values are missing, then, in step 310, the blockchain node 102 may consider each of these missing blockchain data values to be orphaned blockchain data values. In step 312, the blockchain node 102 may count the number of orphaned blockchain data values and determine if the number of orphaned blockchain data values meets a predetermined number. If the number of orphaned transactions does not meet the predetermined number, then the process 300 may return to step 302 where the blockchain node 102 receives new, unconfirmed blockchain data values and continues until the predetermined number of orphaned blockchain data values has been reached.

Once the number of orphaned blockchain transactions meets or exceeds the predetermined number, then, in step 314, the generation module 220 of the blockchain node 102 may generate a new block that includes all of the orphaned blockchain data values. The generation module 220 may generate a block reference value using the block header of the most recently added block, may generate a transaction reference value using the orphaned blockchain data values, may generate a new block header that includes a timestamp, the transaction reference value, the block reference value, and a flag indicating that the new block is a block of orphaned transactions, and generate the new block that includes the new block header and all of the orphaned blockchain data values. In step 316, the transmitting device 224 of the blockchain node 102 may electronically transmit the newly generated block to a plurality of other blockchain nodes 102 in the blockchain network 106 for confirmation and acceptance thereof as a new block.

Figure 4:
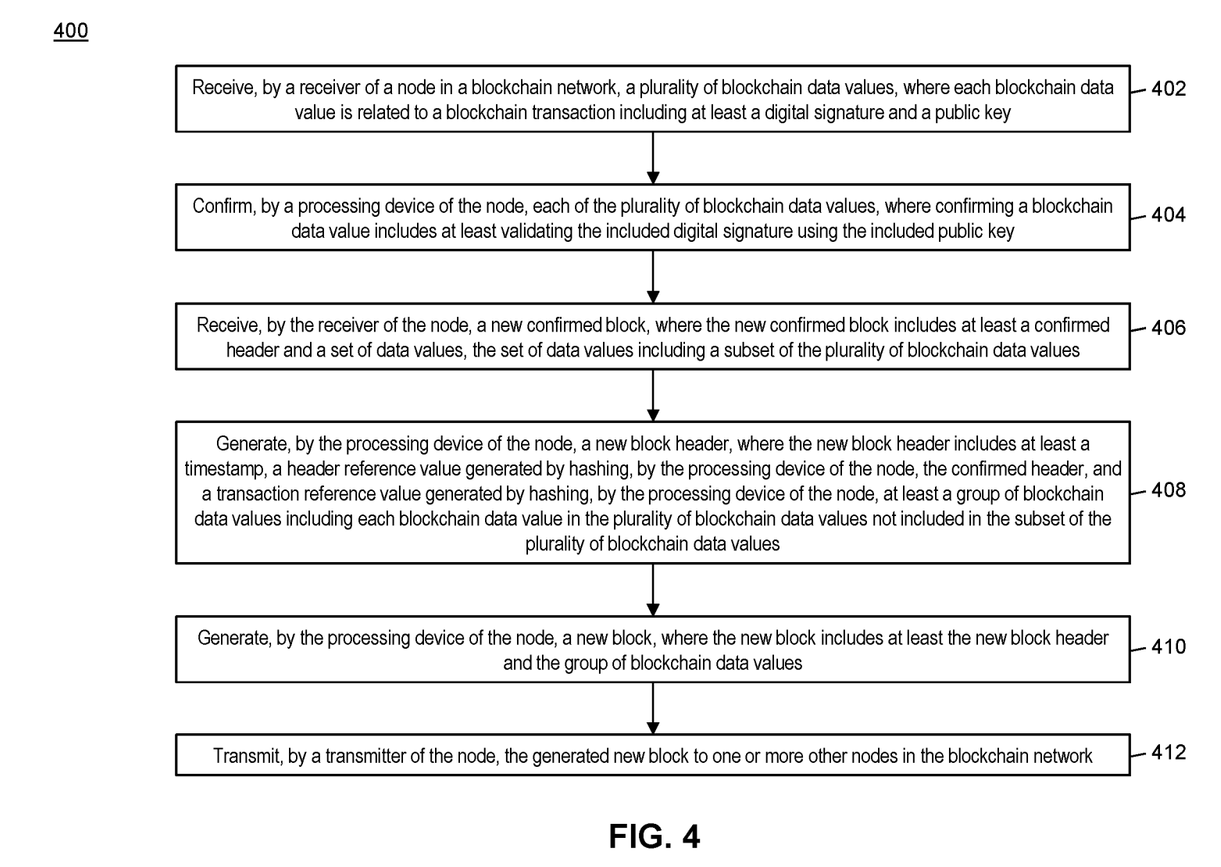
FIG. 4 is a flow chart illustrating an exemplary method for expedited confirmation and inclusion of orphaned transactions in a blockchain network in accordance with exemplary embodiments.

Exemplary Method for Expedited Confirmation and Inclusion of Orphaned Transactions FIG. 4 illustrates a method 400 for the expedited confirmation of orphaned blockchain data values in a blockchain and inclusion thereof in a new block without re-confirmation.

In step 402, a plurality of blockchain data values may be received by a receiver (e.g., the receiving device 202) of a node (e.g., a blockchain node 102) in a blockchain network (e.g., the blockchain network 106), where each blockchain data value is related to a blockchain transaction including at least a digital signature and a public key. In step 404, each of the plurality of blockchain data values may be confirmed by a processing device (e.g., the validation module 222) of the node, where confirming a blockchain data value includes at least validating the included digital signature using the included public key.

In step 406, a new confirmed block may be received by the receiver of the node, where the new confirmed block includes at least a confirmed header and a set of data values, the set of data values including a subset of the plurality of blockchain data values. In step 408, a new block header may be generated by the processing device (e.g., the generation module 220) of the node, where the new block header includes at least a timestamp, a header reference value generated by hashing, by the processing device of the node, the confirmed header, and a transaction reference value generated by hashing, by the processing device of the node, at least a group of blockchain data values including each blockchain data value in the plurality of blockchain data values not included in the subset of the plurality of blockchain data values.

In step 410, a new block may be generated by the processing device of the node, where the new block includes at least the new block header and the group of blockchain data values. In step 412, the generated new block may be transmitted by a transmitter (e.g., the transmitting device 224) of the node to one or more other nodes in the blockchain network.

In one embodiment, the new block header may further include an orphaned transaction flag. In some embodiments, confirmation of the new blockchain data values in the plurality of blockchain data values may not be repeated prior to generation of the new block header or new block. In one embodiment, the method 400 may further include: receiving, by the receiver of the node, one or more additional blockchain data values prior to generating the new block header, each additional blockchain data value including at least a digital signature and a public key; and confirming, by the processing device of the node, each of the one or more additional blockchain data values, where confirming each of the one or more additional blockchain data values includes at least validating the included digital signature using the included public key, wherein each of the one or more additional blockchain data values is included in the group of blockchain data values. In some embodiments, a number of the blockchain data values in the plurality of blockchain data values not included in the subset of the plurality of blockchain data values may exceed a predetermined number of transactions.

In one embodiment, the method 400 may also include: receiving, by the receiver of the node, a set of additional blockchain data values prior to generating the new block header, each additional blockchain data value including at least a digital signature and a public key; confirming, by the processing device of the node, each of the set of additional blockchain data values, where confirming each of the one or more additional blockchain data values includes at least validating the included digital signature using the included public key; and receiving, by the receiver of the node, a second confirmed block, where the second confirmed block includes at least a confirmed header and a set of included data values, the set of included data values including a subset of the set of additional blockchain data values, wherein each additional blockchain data value in the group of additional blockchain data values not included in the subset of the set of additional blockchain data values is included in the group of blockchain data values. In a further embodiment, a number of the blockchain data values included in the plurality of blockchain data values not included in the subset of the plurality of blockchain data values may not exceed a predetermined number of transactions. In an even further embodiment, a number of the blockchain data values included in a combination of the plurality of blockchain data values not included in the subset of the plurality of blockchain data values and the blockchain data values not included in the subset of the set of additional blockchain data values may exceed the predetermined number of transactions.

Computer System Architecture

Figure 5:
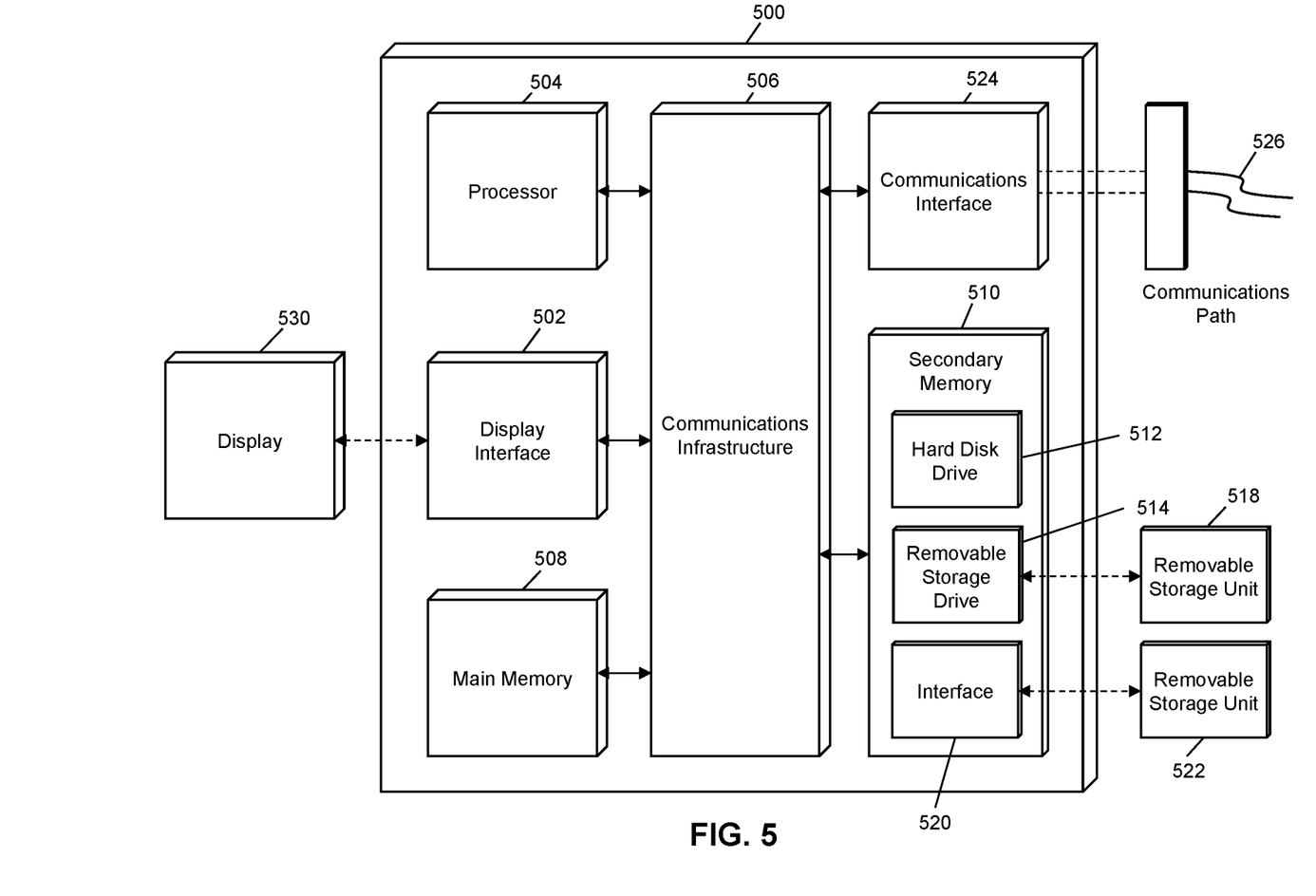
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the blockchain node 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for expedited confirmation and inclusion of orphaned transactions in a blockchain network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for expedited confirmation and inclusion of orphaned transactions in a blockchain network, comprising:
   receiving, by a receiver of a node in a blockchain network, a plurality of blockchain data values, where each blockchain data value is related to a blockchain transaction including at least a digital signature and a public key;
   confirming, by processor of the node, each of the plurality of blockchain data values, where confirming a blockchain data value includes at least validating the included digital signature using the included public key;
   receiving, by the receiver of the node, a new confirmed block, where the new confirmed block includes at least a confirmed header and a set of data values, the set of data values including a subset of the plurality of blockchain data values;
   generating, by the processor of the node, a new block header, where the new block header includes at least a timestamp, a header reference value generated by hashing, by the processor of the node, the confirmed header, and a transaction reference value generated by hashing, by the processor of the node, at least a group of blockchain data values including each blockchain data value in the plurality of blockchain data values not included in the subset of the plurality of blockchain data values;
   generating, by the processor of the node, a new block, where the new block includes at least the new block header and the group of blockchain data values; and
   transmitting, by a transmitter of the node, the generated new block to one or more other nodes in the blockchain network.

2. The method of claim 1, wherein the new block header further includes an orphaned transaction flag.

3. The method of claim 1, wherein confirmation of the blockchain data values in the plurality of blockchain data values is not repeated prior to generation of the new block header or new block.

4. The method of claim 1, further comprising:
   receiving, by the receiver of the node, one or more additional blockchain data values prior to generating the new block header, each additional blockchain data value including at least a digital signature and a public key; and
   confirming, by the processor of the node, each of the one or more additional blockchain data values, where confirming each of the one or more additional blockchain data values includes at least validating the included digital signature using the included public key, wherein each of the one or more additional blockchain data values is included in the group of blockchain data values.

5. The method of claim 1, further comprising:
   receiving, by the receiver of the node, a set of additional blockchain data values prior to generating the new block header, each additional blockchain data value including at least a digital signature and a public key;
   confirming, by the processor of the node, each of the set of additional blockchain data values, where confirming each of the one or more additional blockchain data values includes at least validating the included digital signature using the included public key; and
   receiving, by the receiver of the node, a second confirmed block, where the second confirmed block includes at least a confirmed header and a set of included data values, the set of included data values including a subset of the set of additional blockchain data values, wherein
   each additional blockchain data value in the group of additional blockchain data values not included in the subset of the set of additional blockchain data values is included in the group of blockchain data values.

6. The method of claim 5, wherein a number of the blockchain data values included in the plurality of blockchain data values not included in the subset of the plurality of blockchain data values does not exceed a predetermined number of transactions.

7. The method of claim 6, wherein a number of the blockchain data values included in a combination of the plurality of blockchain data values not included in the subset of the plurality of blockchain data values and the blockchain data values not included in the subset of the set of additional blockchain data values exceeds the predetermined number of transactions.

8. The method of claim 1, wherein a number of the blockchain data values in the plurality of blockchain data values not included in the subset of the plurality of blockchain data values exceeds a predetermined number of transactions.

9. A system for expedited confirmation and inclusion of orphaned transactions in a blockchain network, comprising:
   a transmitter of a node in a blockchain network;
   a receiver of the configured to receive a plurality of blockchain data values, where each blockchain data value is related to a blockchain transaction including at least a digital signature and a public key; and
   a processor of the node configured to confirm each of the plurality of blockchain data values, where confirming a blockchain data value includes at least validating the included digital signature using the included public key, wherein
   the receiver of the node is further configured to receive a new confirmed block, where the new confirmed block includes at least a confirmed header and a set of data values, the set of data values including a subset of the plurality of blockchain data values, the processor of the node is further configured to
generate a new block header, where the new block header includes at least a timestamp, a header reference value generated by hashing, by the processor of the node, the confirmed header, and a transaction reference value generated by hashing, by the processor of the node, at least a group of blockchain data values including each blockchain data value in the plurality of blockchain data values not included in the subset of the plurality of blockchain data values, and generate a new block, where the new block includes at least the new block header and the group of blockchain data values, and the transmitter of the node is configured to transmit the generated new block to one or more other nodes in the blockchain network.

10. The system of claim 9, wherein the new block header further includes an orphaned transaction flag.

11. The system of claim 9, wherein confirmation of the blockchain data values in the plurality of blockchain data values is not repeated prior to generation of the new block header or new block.

12. The system of claim 9, wherein the receiver of the node is further configured to receive one or more additional blockchain data values prior to generating the new block header, each additional blockchain data value including at least a digital signature and a public key, the processor of the node is further configured to confirm each of the one or more additional blockchain data values, where confirming each of the one or more additional blockchain data values includes at least validating the included digital signature using the included public key, and each of the one or more additional blockchain data values is included in the group of blockchain data values.

13. The system of claim 9, wherein the receiver of the node is further configured to receive a set of additional blockchain data values prior to generating the new block header, each additional blockchain data value including at least a digital signature and a public key, the processor of the node is further configured to confirm each of the set of additional blockchain data values, where confirming each of the one or more additional blockchain data values includes at least validating the included digital signature using the included public key, the receiver of the node is further configured to receive a second confirmed block, where the second confirmed block includes at least a confirmed header and a set of included data values, the set of included data values including a subset of the set of additional blockchain data values, and each additional blockchain data value in the group of additional blockchain data values not included in the subset of the set of additional blockchain data values is included in the group of blockchain data values.

14. The system of claim 13, wherein a number of the blockchain data values included in the plurality of blockchain data values not included in the subset of the plurality of blockchain data values does not exceed a predetermined number of transactions.

15. The system of claim 14, wherein a number of the blockchain data values included in a combination of the plurality of blockchain data values not included in the subset of the plurality of blockchain data values and the blockchain data values not included in the subset of the set of additional blockchain data values exceeds the predetermined number of transactions.

16. The system of claim 9, wherein a number of the blockchain data values in the plurality of blockchain data values not included in the subset of the plurality of blockchain data values exceeds a predetermined number of transactions.

* * * * *